Figure 1:
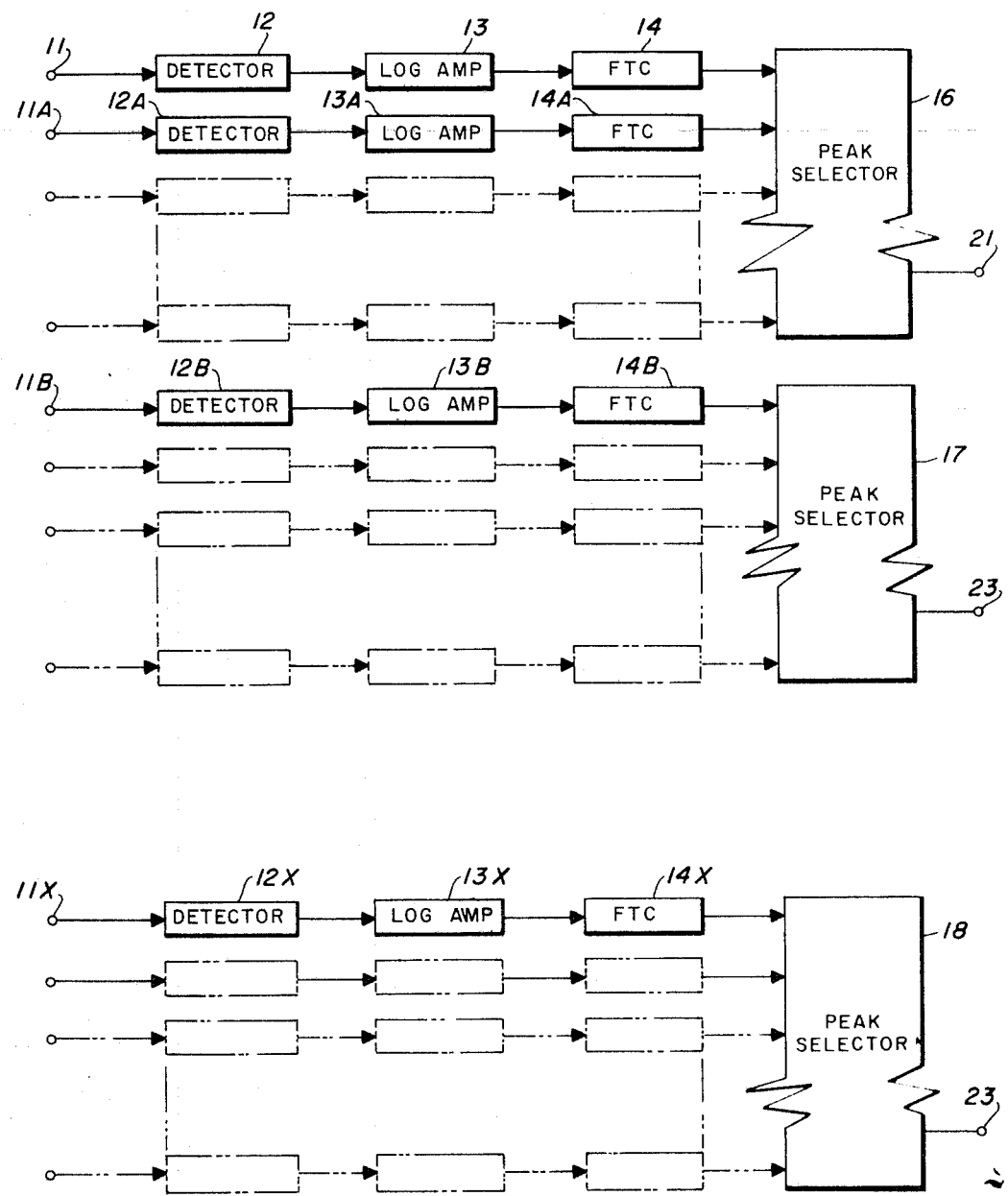

United States Patent

[11] 3,622,959

[72] Inventor Edward C. Watters
 Annapolis, Md.
[21] Appl. No. 294,804
[22] Filed July 10, 1963
[45] Patented Nov. 23, 1971
[73] Assignee The United States of America as represented by the Secretary of the Navy

[54] LOGARITHMIC FAST TIME CONSTANT SONAR RECEIVER
 2 Claims, 2 Drawing Figs.
[52] U.S. Cl. .................................................. 340/3 D,
 340/5 R, 340/6 R
[51] Int. Cl. ...................................................... G01s 9/66,
 G01s 3/00
[50] Field of Search ............................................ 340/3, 5, 6,
 15, 16, 3 D; 343/8, 16.2, 17.1, 120

[56] References Cited
UNITED STATES PATENTS
3,141,164 7/1964 Halcomb et al. ............... 343/16
3,001,190 9/1961 Fryklund ....................... 340/6
3,061,831 10/1962 Fromm ......................... 343/120

*Primary Examiner*—Richard A. Farley
*Attorneys*—Louis A. Miller, Paul N. Critchlow and Richard K. MacNeill CLAIM: 1. A logarithmic fast time constant sonar receiver comprising:
a plurality of circuits for producing simultaneous signals from a plurality of azimuth beams,
a plurality of detectors, each of said detectors connected to a different one of said circuits,
a logarithmic amplifier, first switching means sequentially connecting said amplifier to the outputs of said detectors,
a plurality of lowpass filters, and
second switching means sequentially connecting said plurality of lowpass filters to the output of said amplifier,
so that said plurality of signals are sequentially processed.

INVENTOR.
EDWARD C. WATTERS

LOGARITHMIC FAST TIME CONSTANT SONAR RECEIVER

This invention relates to a logarithmic fast-time-constant sonar receiver and more particularly to a logarithmic fast-time-constant sonar receiver utilizing a time-shared logarithmic amplifier.

In the more modern sonar systems where simultaneous reception from up to 48 azimuth beams or more must be detected and analyzed, a problem in implementation has arisen resulting from the number of beams, and in some cases, associated doppler channels for segregating doppler signals. In some instances this would amount to having 32 doppler channels for each azimuth beam, and in the case where there are 48 azimuth beams, 1,536 receiving amplifiers would be necessary. Because of reverberation noise problems encountered in sonar reception, it is further desirable to utilize logarithmic fast-time-constant receivers to provide constant noise levels. Hence, with the simultaneous reception systems outlined above, 1,536 logarithmic amplifiers would be necessary for an ideal sonar logarithmic fast-time-constant receiver. The main problems encountered in this type of system would be the cost and space required for implementation.

According to the invention, a multichannel receiver is provided, each channel having a separate detector, and a logarithmic amplifier which is switched into and out of each channel. The output of the logarithmic amplifier is filtered to remove switching transients and passed through a fast-time-constant network to doppler channel peak selectors for each of the azimuth beams. The output of each peak selector can then be utilized as desired.

It is thus an object of the present invention to provide a logarithmic fast-time-constant sonar receiver which is adapted for utilization in a large number of azimuth beams.

A further object of the invention is the provision of a logarithmic fast-time-constant sonar receiver which can be utilized in a simultaneous azimuth channel reception system having a multiple of doppler channels.

Yet another object of the invention is a provision of a logarithmic fast-time-constant sonar receiver which is relatively inexpensive and requires a minimum of components.

A further object of the present invention is a provision of a logarithmic fast-time-constant sonar receiver which is extremely reliable.

Figure 2:
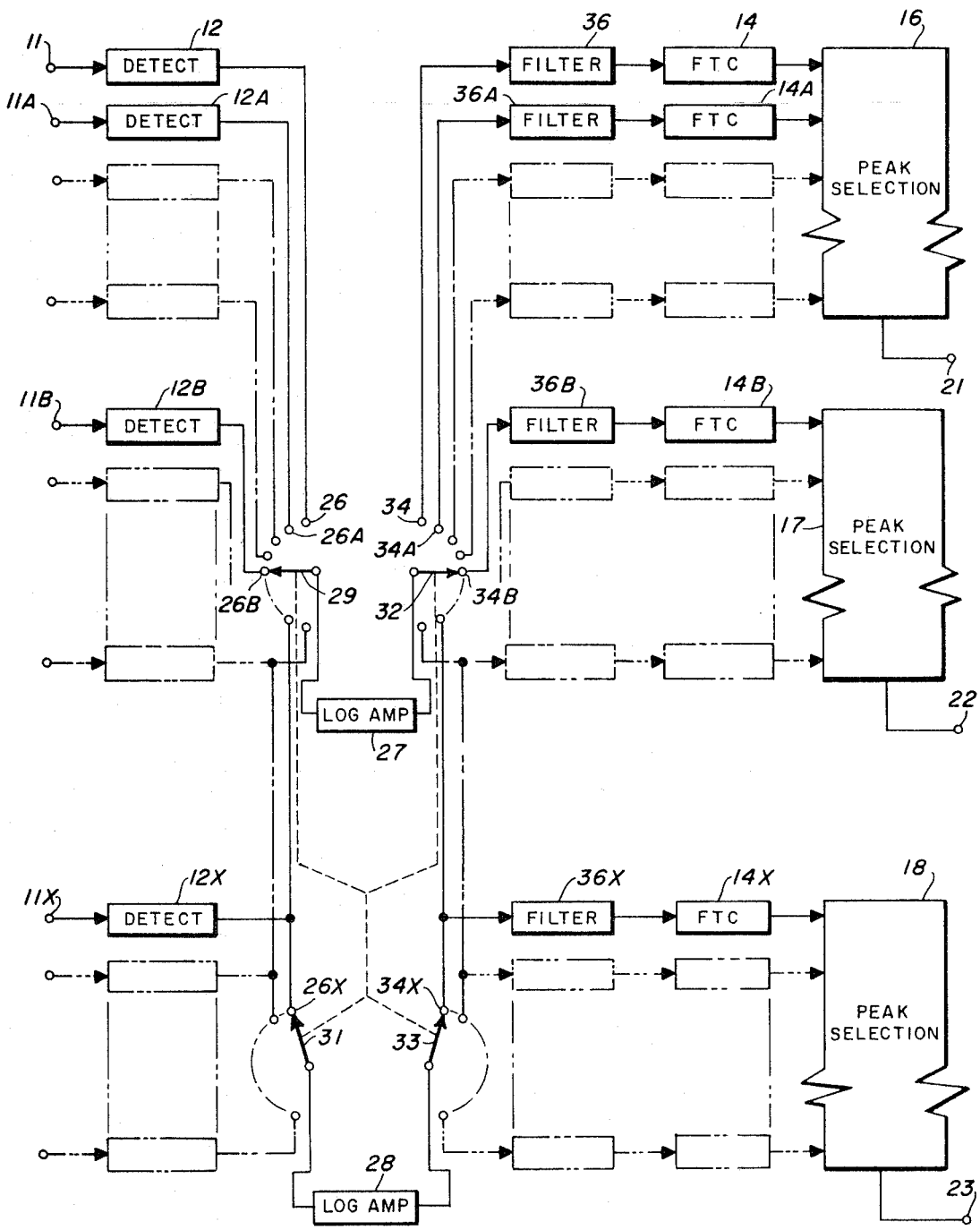

Other objects and many of the attendant advantages of this invention will be readily appreciated as the same becomes better understood by references to the following description when considered in connection with the accompanying drawings in which like reference numerals designate like parts throughout the figures thereof and wherein:

FIG. 1 is a block diagram of an ideal logarithmic fast-time-constant sonar receiver; and FIG. 2 is a block diagram of an ideal logarithmic fast-time-constant sonar receiver utilizing the present invention.

Referring to FIG. 1 there is shown input terminals 11, 11a, 11b and 11x coupled to detectors 12, 12a, 12b and 12x. The output of detectors 12, 12a, 12b and 12x are connected to logarithmic amplifiers 13, 13a, 13b and 13x respectively, the outputs of which are connected to fast-time-constant networks 14, 14a, 14b and 14x respectively. The outputs of fast-time-constant networks 14, and 14a are connected to peak selector 16. The output of fast-time-constant network 14b is connected to peak selector 17 and the output of fast-time-constant network 14x is connected to peak selector 18. The outputs of peak selectors 16, 17 and 18 are taken at output terminals 21, 22 and 23.

Referring to FIG. 2 input terminals 11 11a, 11b and 11x are connected to detectors 12, 12a, 12b and 12x respectively. The outputs of detectors 12, 12a, 12b and 12x are connected to contacts 26, 26a, 26b and 26x, respectively. Contact 26b is connected to log amplifier 27 and contact 26x is connected to logarithmic amplifier 28 through switch arms 29 and 31, respectively. The outputs of logarithmic amplifiers 27 and 28 are connected through switch arms 32 and 33, respectively to contacts 34b and 34x, respectively. Switch contacts 34, 34a, 34b and 34x are connected to low-pass filters 36, 36a, 36b and 36x, respectively. The outputs of low-pass filters 36, 36a, 36b and 36x are connected to fast-time-constant networks 14, 14a, 14b and 14c, respectively. The outputs of fast-time-constant networks 14 and 14a are connected to peak selector 16. The output of fast-time-constant network 14b is connected to peak selector 17, and the output of fast-time-constant network 14c is connected to peak selector 18. The outputs of peak selectors 16, 17 and 18 are connected to outputs terminals 21, 22 and 23, respectively.

OPERATION

Referring now to FIG. 1, two of the inputs from one azimuth beam are shown at 11 and 11a, one of the inputs from another azimuth beam is shown at 11b, and one input from a third azimuth beam is shown at 11x. While only two inputs in one case and one in the other two cases are illustrated, it is to be understood that up to 32 inputs may be necessary for each azimuth beam depending upon the doppler channels utilized. While only three azimuth beams are shown it is to be understood that any number of azimuth beam divisions can be utilized such as 36 or 48, for example. As previously discussed, each input from each doppler channel in each beam is passed through a detector, for example, detector 12, then through a logarithmic amplifier and finally through a fast-time-constant network to minimize reverberation effects and keep the general noise background constant. The doppler channels within each azimuth beam are coupled to one peak selector which selects the peak signal from the different doppler channels which in turn gives an indication of velocity of any target of interest. The output from the peak selector, for example 16, is taken at terminal 21. Hence, it is seen that for the ideal logarithmic fast-time-constant sonar receiver, a separate logarithmic amplifier is necessary for each doppler channel which, as pointed out above, can be as high as 1536, one corresponding to each input.

Referring to FIG. 2 a more practical system is shown. Due to the expense and space requirements of the implementation of the embodiment of FIG. 1 one or more time-shared logarithmic amplifiers for the entire system is utilized in place of a logarithmic amplifier for each doppler channel as shown in FIG. 1. In FIG. 2, two such logarithmic amplifiers are shown at 27 and 28 which are each connected through two switch arms to the various doppler channels. The dashed lines shown represent conventional interlock mechanism for synchronizing the input and output switches of each amplifier. It has been found that since sonar receivers are extremely narrow-band, a satisfactory output in the case of 1,536 channels utilizing two logarithmic amplifiers as shown at 27 and 28 will result from a switching frequency of 50 kilocycles. The low-pass filters, 36, 36a, 36b and 36x have been added to obviate the effects of switching transients.

It should be understood, of course, that the foregoing disclosure relates to only a preferred embodiment of the invention and that it is intended to cover all changes and modifications of the example the invention herein chosen for the purposes of the disclosure which do not constitute departures from the spirit and scope of the invention.

What is claimed is:

1. A logarithmic fast-time-constant sonar receiver comprising;

a plurality of circuits for producing simultaneous signals from a plurality of azimuth beams, a plurality of detectors, each of said detectors connected to a different one of said circuits, a logarithmic amplifier, first switching means sequentially connecting said amplifier to the outputs of said detectors, a plurality of low-pass filters, and second switching means sequentially connecting said plurality of low-pass filters to the output of said amplifier, so that said plurality of signals are sequentially processed.

2. The logarithmic fast-time-constant sonar of claim 1 wherein said first and second switching means each comprises a highhspeed switch and means for synchronizing said switches.

* * * * *